United States Patent
Nystrom

(10) Patent No.: US 7,206,474 B2
(45) Date of Patent: Apr. 17, 2007

(54) HEATING OF TRENCHES IN AN OPTICAL BUBBLE SWITCH

(75) Inventor: Michael James Nystrom, San Jose, CA (US)

(73) Assignee: Avago Technologies Fiber IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 10/115,217

(22) Filed: Apr. 3, 2002

(65) Prior Publication Data

US 2003/0190111 A1   Oct. 9, 2003

(51) Int. Cl.
*G02B 6/26* (2006.01)
*G02B 6/00* (2006.01)

(52) U.S. Cl. .......................... 385/16; 385/19
(58) Field of Classification Search ............. 385/16–19
See application file for complete search history.

(56) References Cited

U.S. PATENT DOCUMENTS

| | | | | |
|---|---|---|---|---|
| 5,699,462 A | * | 12/1997 | Fouquet et al. | 385/18 |
| 6,329,655 B1 | * | 12/2001 | Jack et al. | 250/338.1 |
| 6,674,933 B2 | * | 1/2004 | Troll | 385/16 |
| 6,697,548 B2 | * | 2/2004 | LoCascio et al. | 385/16 |
| 2002/0159676 A1 | * | 10/2002 | Nystrom et al. | 385/16 |
| 2003/0012483 A1 | * | 1/2003 | Ticknor et al. | 385/16 |
| 2003/0077024 A1 | * | 4/2003 | Nishimura | 385/17 |
| 2003/0086637 A1 | * | 5/2003 | Carey et al. | 385/16 |
| 2004/0067009 A1 | * | 4/2004 | Scholz et al. | 385/16 |
| 2004/0076363 A1 | * | 4/2004 | Schroeder et al. | 385/16 |

* cited by examiner

*Primary Examiner*—Sung Pak

(57) ABSTRACT

An optical bubble switch having structures for heating trenches in response to applied electromagnetic energy. The structures for heating trenches according to the present teachings reduce the power dissipation in power lines in an MCC and facilitate drying of trench walls during bubble formation.

15 Claims, 4 Drawing Sheets

HEATING OF TRENCHES IN AN OPTICAL BUBBLE SWITCH

BACKGROUND OF THE INVENTION

1. Field of Invention

The present invention pertains to the field of optical bubble switches. More particularly, this invention relates to heating of trenches in optical bubble switches.

2. Art Background

A typical optical bubble switch includes a layer of waveguides for conducting light and a structure for altering the routing of light through the waveguides. A structure that contains the waveguides is commonly referred to as a planar light wave circuit (PLC) and a structure that alters the routing of light through the waveguides of a PLC is commonly referred to as a matrix controller chip (MCC).

The PLC of a typical optical bubble switch includes trenches formed through the waveguide layer. Typically, a fluid is disposed between the PLC and MCC which fills in the trenches and facilitates the flow of light through the waveguides. The MCC under control of switching circuitry usually heats the fluid in selected areas causing the formation of bubbles in selected trenches. A bubble formed in a trench usually changes the refractive index of the trench, thereby altering the flow of light in the waveguide layer.

In prior optical bubble switches, the electrical power needed to form bubbles is usually carried via conductive lines in the MCC. The electrical current flow through these lines usually causes undesirable amounts of power dissipation and limits the number of switching elements that may be implemented in a bubble switch array.

In addition, prior optical bubble switches may suffer from the incomplete formation of bubbles in its trenches. Unfortunately, a less than fully formed bubble can still leave traces of fluid on the edges of a trench and cause undesirable switching characteristics.

SUMMARY OF THE INVENTION

An optical switch is disclosed having structures for heating trenches in response to applied electromagnetic energy. The structures for heating trenches according to the present teachings reduce the power dissipation in power lines in an MCC and facilitate drying of trench walls during bubble formation.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
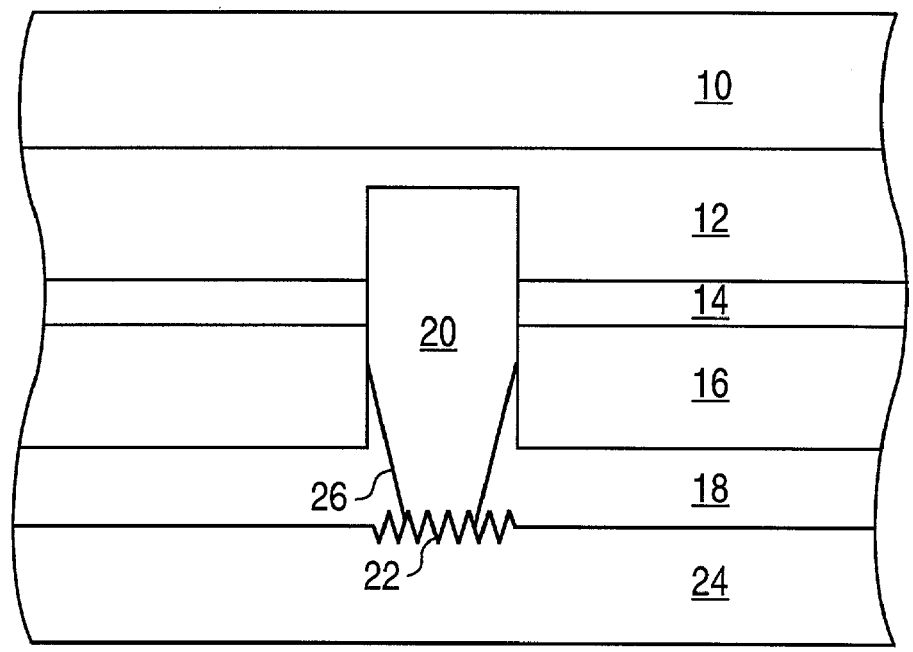
FIG. 1 shows the basic elements of an optical bubble switch.

FIG. 1 shows the basic elements of an optical bubble switch. The optical bubble switch shown includes a PLC formed on a substrate 10, a lower cladding 12, a waveguide 14, an upper cladding 16. The optical bubble switch further includes an MCC 24. A trench 20 is formed through the waveguide 14. A resistor 22 which is switched on and off by circuitry in the MCC 24 causes the formation of a bubble 26 in the trench 20.

Figure 2:
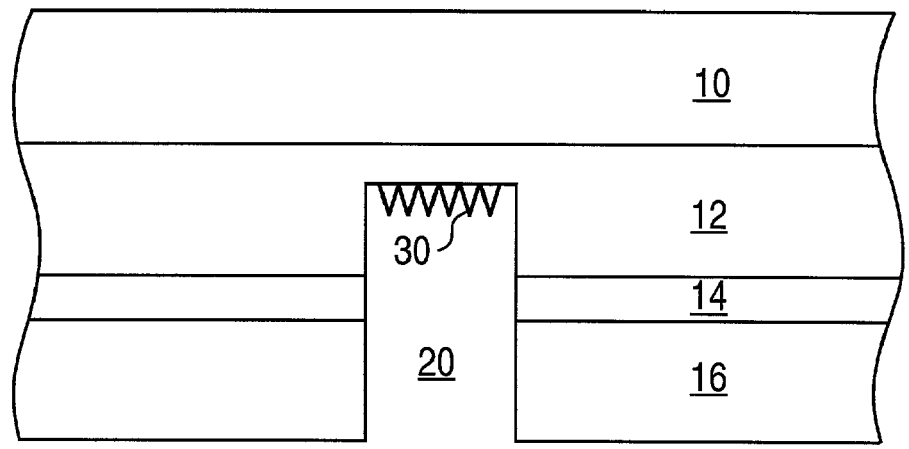
FIG. 2 shows one embodiment of an optical bubble switch according to the present teachings.

FIG. 2 shows one embodiment of an optical bubble switch according to the present teachings. The optical bubble switch in this embodiment includes a heating element 30 which is formed in a closed end of the trench 20. The heating element 30 is formed such that electromagnetic waves of a predetermined frequency are absorbed by the heating element 30. The heating element 30 is formed so that it absorbs the electromagnetic waves and converts the electromagnetic waves into heat. The heat from the heating element 30 facilitates drying of the walls of the trench 20.

The electromagnetic waves that are applied to the optical bubble switch and absorbed by the heating element 30 may be microwaves or RF waves.

The material for forming the heating element 30 is selected to be conductive in response to the electromagnetic waves to which it is subjected and to have sufficient resistance to heat up. Such a material may be a relatively low conductivity semi-conducting material. Example materials include refractory metals with dopants added. Other example materials include tungsten, tantalum, molybdenium, platinum, and their alloys, and alloys of nickel and chromium.

The heating element 30 may be sputter deposited using thick or thin film deposition techniques, evaporation techniques, chemical vapor deposition, etc. The waveguide 14 may be formed of fused silica.

The shape of the trench 20 may be used to define the shape of the heating element 30. The material for the heating element 30 may be deposited immediately after etching of the trench 20. The mask material used to define the trench 20 may also be used to define the shape of the heating element 30 as part of a lift-off process.

Figure 3:
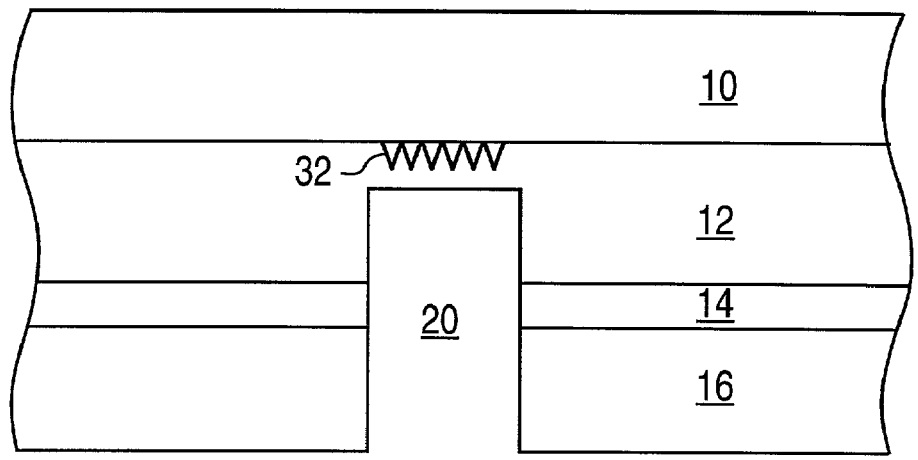
FIG. 3 shows another embodiment of an optical bubble switch according to the present teachings.

FIG. 3 shows another embodiment of an optical bubble switch according to the present teachings. The optical bubble switch in this embodiment includes a heating element 32 which is formed in at an interface between the lower cladding 12 and the substrate 10. The heating element 32 is formed such that it absorbs electromagnetic energy at the appropriate frequency and converts the electromagnetic energy into heat.

The heating element 32 may be deposited and patterned prior to the deposition of the lower cladding 12. Example materials for the heating element 32 include tungsten, tantalum, molybdenium, platinum, and their alloys, and alloys of nickel and chromium.

An array of optical bubble switches having the structures disclosed above may be entirely bathed by an appropriate electromagnetic energy source to facilitate drying of trench walls. Alternatively, structures may be provided to apply electromagnetic energy to individual optical bubble switches in an array.

Figure 4:
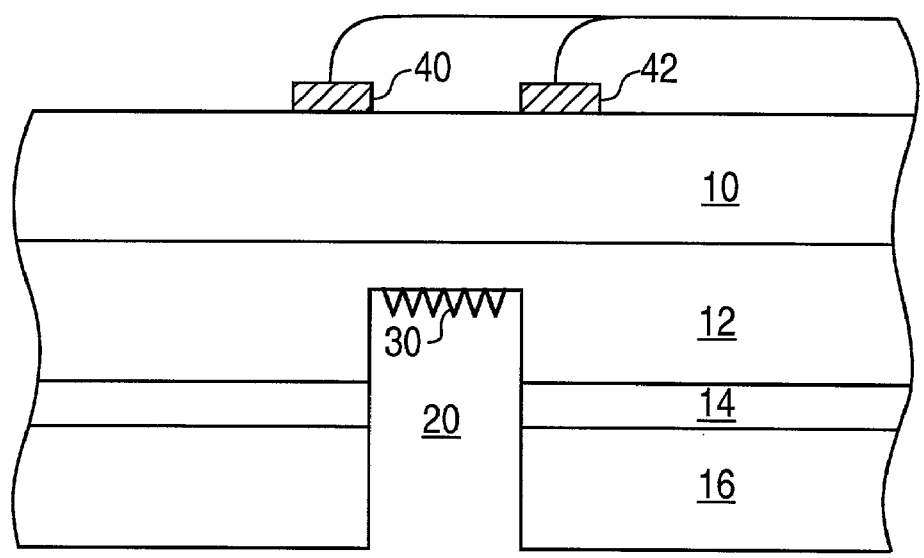
FIG. 4 shows a set of electromagnetic wave transmission lines patterned on a backside of the substrate.

FIG. 4 shows a set of electromagnetic wave transmission lines 40–42 patterned on a backside of the substrate 10. The transmission lines 40–42 may be formed after high temperature processing of the waveguide structure is complete. The structure shown enables concentration of electromagnetic energy near selected ones of the heating elements which are provided according the present teachings. Alternatively, the transmission lines 40–42 may be formed on the top side of the PLC structure or the top side of the MCC structure.

Figure 5:
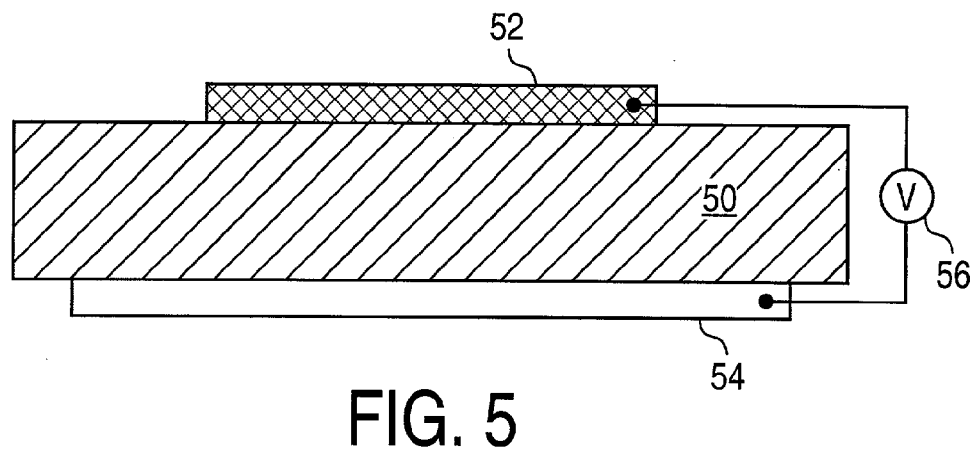
FIG. 5 shows yet another embodiment of an optical bubble switch according to the present teachings.

FIG. 5 shows yet another embodiment of an optical bubble switch according to the present teachings. In this embodiment, a heating element 52 is patterned onto a dielectric material 50. The dielectric material 50 is formed such that its dielectric constant at the frequency of microwaves changes when it is in the presence of a DC field. The heating element 52 is formed so that it does not absorb electromagnetic energy at the desired frequency when no DC field is applied to the dielectric material 50.

When a DC field is applied using a source 56, the effective length of the heating element 52 changes so that it absorbs the applied electromagnetic energy. The absorbed electromagnetic energy heats up the heating element 52 which in turn heats the fluid above the heating element 52 and forms a bubble. When the DC field from the source 56 is removed, the heating element 52 no longer absorbs electromagnetic energy and it cools. Alternatively, the heating element 52 and dielectric 50 may be implemented so that the heating element 52 absorbs electromagnetic energy only when the source 56 is off.

In the embodiment shown, the heating element 52 acts as one of the electrodes for applying a DC field. Alternatively, a DC field may be applied using electrodes not connected to the heating element 52. In another alternative, a low frequency AC field may be used in place of the DC field.

The heating element 52 may be formed of multiple types of material which include a resistor material. Example materials include, gold, aluminum, Tantalum, etc. with a silicon or a silicon-doped resistive portion, or may be formed of aluminum/tungsten alloys.

Example materials for the dielectric material 50 include ferroelectrics such as BaTiO3, and SrBaTiO3.

Figure 6:
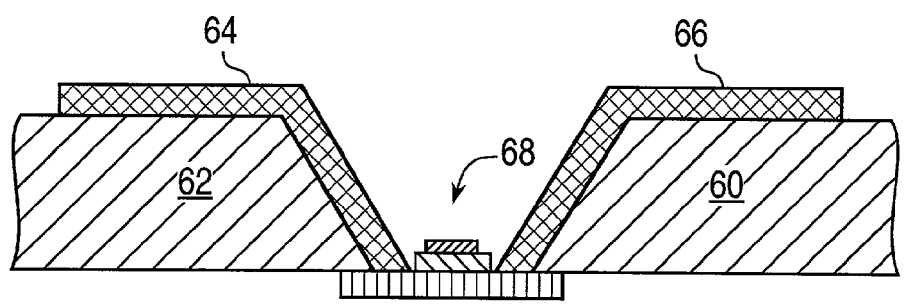
FIG. 6 shows still another embodiment of an optical bubble switch according to the present teachings.

FIG. 6 shows still another embodiment of an optical bubble switch according to the present teachings. In this embodiment, a heating element on dielectric regions 60–62 is composed of a portion 64 and a portion 66 which are connected together or isolated from one another by a switch 68. When the switch 68, for example a CMOS switch, is off, the portions 64 and 66 are electrically separated and the heating element does not absorb any applied electromagnetic waves.

The switch 68 is used to switch on and off an antenna which is made up of the portions 64 and 66. When the switch 68 is on, the portions 64 and 66 are electrically connected and the combined heating element acts as an antenna to absorb applied electromagnetic energy. Alternatively, the optical bubble switch may be implemented so that the portions 64 and 66 only absorb electromagnetic energy when they are disconnected by the switch 68.

Figure 7:
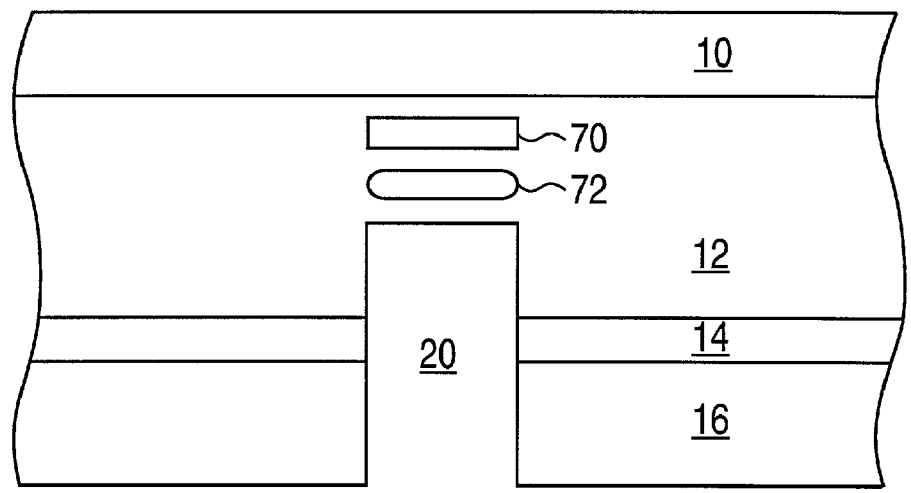
FIG. 7 shows another embodiment of an optical bubble switch according to the present teachings.

FIG. 7 shows another embodiment of an optical bubble switch according to the present teachings. In this embodiment, a pump beam waveguide 70 and an optical absorbing region 72 are formed in the lower cladding 12.

The pump beam waveguide 70 may be implemented as a planar waveguide, an array of linear waveguides, or a matrix of cross linear waveguides. It is preferable that the pump beam waveguide 70 have a substantially uniform power density throughout.

The optical absorbing region 72 may be formed near the top, i.e. closed end, of the trench 20. In this example, the optically absorbing region 72 is separated from the pump beam waveguide 70 and the closed end of the trench 20. In other embodiments, there may be no separation between one or more of these structures.

An optical pump, for example at an infrared frequency, is inputted into the pump beam waveguide 70. The optical pump is preferably not at a frequency used for communication via the waveguide 14. The optical absorbing region 72 is located close enough to the pump beam waveguide 70 to be optically coupled. The light from the pump beam waveguide 70 which is coupled into the optical absorbing region 72 causes the optical absorbing region 72 to heat and dry the inner walls of the trench 20.

The pump waveguide 70 is transparent to the optical frequency applied so it spreads power throughout. The optical absorbing region 72 may be formed of glass with a dopant for optical absorption—for example—OH elements added to glass. Transition metals may also be used as dopants for creating optical absorption in glass.

Figure 8:
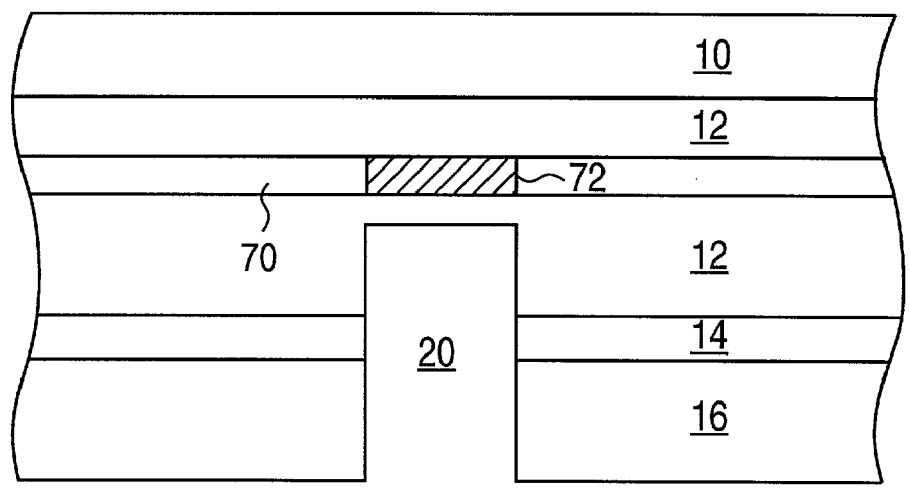
FIG. 8 shows yet another embodiment of an optical bubble switch according to the present teachings.

FIG. 8 shows yet another embodiment of an optical bubble switch according to the present teachings. In this embodiment, the optical absorbing region 72 is part of the pump beam waveguide 70. As before, an optical pump is inputted into the pump beam waveguide 70. The optical pump causes the optical absorbing region 72 to heat and dry the inner walls of the trench 20.

The optical bubble switches described above may be implemented in a cross-point optical bubble switch array having the PLC layers, the MCC layer, and a moly base, and a fluid reservoir between the PLC and MCC.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. An optical bubble switch, comprising:
   trench for holding a fluid;
   structure that generates heat in response to electromagnetic energy;
   a set of transmission lines that apply electromagnetic energy to the structure such that the heat generated by the structure in response to the electromagnetic energy dries the fluid in the trench.

2. The optical bubble switch of claim 1, wherein the structure comprises a heating element disposed within the trench.

3. The optical bubble switch of claim 1, wherein the structure comprises a heating element disposed near the trench.

4. The optical bubble switch of claim 1, wherein the electromagnetic energy is microwave energy.

5. The optical bubble switch of claim 1, wherein the electromagnetic energy is RF energy.

6. The optical bubble switch of claim 1, wherein the electromagnetic energy is infrared energy.

7. An optical bubble switch, comprising:
   trench for holding a fluid;
   structure that heats the trench in response to electromagnetic energy applied to the structure wherein the structure comprises an antenna heating element and a dielectric having a dielectric constant that changes in the presence of a DC field.

8. An optical bubble switch, comprising:
   trench for holding a fluid;

structure that heats the trench in response to electromagnetic energy applied to the structure wherein the structure comprises a pair of antenna heating elements coupled together via a switch.

9. A method for forming an optical bubble switch, comprising:
   forming a trench for holding a fluid;
   forming a structure that generates heat for drying the trench in response to electromagnetic energy applied to the structure;
   forming a set of transmission lines for applying the electromagnetic energy to the structure.

10. The method of claim 9, wherein forming a structure comprises forming a heating element within the trench.

11. The method of claim 9, wherein forming a structure comprises forming a heating element near the trench.

12. A method for forming an optical bubble switch, comprising the steps of:
   forming a trench for holding a fluid;
   forming a structure for heating the trench in response to electromagnetic energy applied to the structure wherein the step of forming a structure for heating comprises the steps of forming an antenna heating element and forming a dielectric having a dielectric constant that changes in the presence of a DC field.

13. A method for forming an optical bubble switch, comprising:
   forming a trench for holding a fluid;
   forming a structure for heating the trench in response to electromagnetic energy applied to the structure wherein the step of forming a structure for heating comprises the steps of forming a pair of antenna heating elements and forming a switch that couples together the antenna heating elements.

14. An optical bubble switch, comprising:
   trench for holding a fluid;
   pump beam waveguide;
   optically absorbing region that heats the trench and dries the fluid in response to electromagnetic energy applied via the pump beam waveguide.

15. The optical bubble switch of claim 14, wherein the optically absorbing region is part of the pump beam waveguide.

* * * * *